Oct. 18, 1960 A. W. ZIEGLER 2,957,041

HIGH PRESSURE COMPRESSION SEAL TERMINAL

Filed Feb. 28, 1957 2 Sheets-Sheet 1

INVENTOR
A. W. ZIEGLER
BY
Walter M. Hill
ATTORNEY

Oct. 18, 1960 A. W. ZIEGLER 2,957,041

HIGH PRESSURE COMPRESSION SEAL TERMINAL

Filed Feb. 28, 1957 2 Sheets-Sheet 2

INVENTOR
A. W. ZIEGLER
BY
Walter M. Hill
ATTORNEY

United States Patent Office 2,957,041

Patented Oct. 18, 1960

2,957,041

HIGH PRESSURE COMPRESSION SEAL TERMINAL

Arthur W. Ziegler, Short Hills, N.J., assignor to Bell Telephone Laboratories, Incorporated, New York, N.Y., a corporation of New York Filed Feb. 28, 1957, Ser. No. 643,007

2 Claims. (Cl. 174—152)

This invention relates to hermetically sealed terminals and more particularly to such terminals which are subject to very high pressures.

It is frequently the practice to position electrical components within hermetically sealed containers whenever it is necessary that the same be protected from ambient conditions such as high pressure, high temperature, water vapors and the like. Such components include quartz and synthetic crystals, capacitors, varistors, resistors, transistors, contact devices, computer networks, et cetera. The electrical leads for the components must of course be brought out through hermetic terminal seals, and various metals, glasses, ceramics, plastics, and rubbers have been previously utilized in making these seals.

The glass and ceramic seal terminals are most often used when high differential pressures are to be encountered, such as in deep-sea submarine cables, pressure chambers, and reaction vessels. In the fabrication of these terminals the glass or ceramic is chemically bonded to a metallic base member under the application of high temperatures. But while the glass or ceramic is carefully selected so that its coefficient of linear expansion approaches that of the metal, there is always present some degree of strain at the interface due to the non-matching expansion characteristics.

The molded rubber and plastic seals in use today are in general easier to fabricate and install than the glass and ceramic seal terminals, but they are not capable of withstanding as high a differential pressure as the latter. Further, they are as a rule not capable of operating at high temperatures or under extreme temperature variations.

It is a primary object of this invention therefore to provide an improved hermetically sealed terminal that is capable of withstanding large differential pressures.

It is a further object of this invention to provide a hermetically sealed terminal that is completely free of "strain cracking," i.e. the cracking of adjoining terminal parts due to non-matching expansion characteristics.

A further object of this invention is to provide a hermetic seal terminal that is capable of operating at high pressures and temperatures.

A still further object of this invention is to provide a hermetically sealed terminal that is readily fabricated and inexpensive and easy to assemble.

These and other objects are attained in accordance with this invention wherein a cylindrical sealing bushing is disposed between a pair of cylindrical, ceramic end spools. An outer tubular member encompasses the bushing and end spools and a lead-in conductor runs axially therethrough. The tubular member is compressed, simultaneously, onto the bushing and end spools by a single compression stroke which serves to lock the end spools in position in addition to radially compressing the bushing. The bushing is thus compressed radially as well as axially between the end spools with the result that very high hydrostatic pressures are set up in the bushing.

Other objects and many of the attendant advantages of the invention will be readily appreciated as the same becomes better understood by reference to the following detailed description when considered in connection with the accompanying drawings in which.

Figure 1:
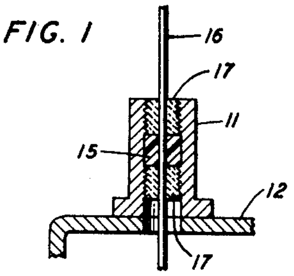
Fig. 1 is a sectional view of a hermetically sealed terminal in accordance with one specific illustrative embodiment of this invention.
Figure 2:
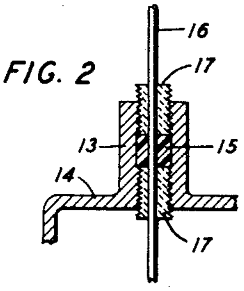
Fig. 2 is a sectional view of a seal terminal in accordance with another specific illustrative embodiment of this invention.

Referring now to the drawings, Figs. 1 and 2 show the structural details of two specific illustrative embodiments of this invention. In Fig. 1, a tubular member 11 is attached to an end plate 12 of a container prior to the formation of the seal, while in Fig. 2 the tubular member 13 is integral with the end plate 14. In either case the end plate 12 or 14 may itself be integral with the container or may be a separate member secured thereto as is known in the art. Within each tubular member is situated a sealing bushing 15 encompassing a central lead-in conductor 16. In accordance with this invention, the sealing bushing 15 is comprised of polytrifluorochloroethylene, known commercially as KEL-F. The container end plates and tubular members may be of any of several materials employed for such purposes in the art, as the seal formed in accordance with this invention is not dependent upon the chemical properties of the metal parts. Thus aluminum, copper, steel, brass, nickel, silver alloys, et cetera, may be employed. Various materials may also be utilized for the lead-in conductor 16 of the seal, and advantageously the lead-in conductor 16 may be a lead of the internal electrical apparatus itself thereby obviating the necessity of a joint or soldered connection within the container between the apparatus lead and the inner end of the central lead-in conductor. In certain specific illustrative embodiments of this invention, a clean but unpolished phosphor bronze wire has been utilized as the lead-in conductor 16. The central lead-in conductor may also be of copper, nickel, brass, bronze, Monel metal, nickel silver or other materials that may be employed as terminal leads. The lead-in conductor need not have any specific chemical or metallurgical properties and thus does not have to be specially treated, as was true with prior rubber or neoprene seal terminals. Instead, bare wire can be used just as it comes from the die.

A pair of end spools 17 are also disposed within each tubular member and they are in abutment against the opposite ends of the sealing bushing. The outer cylindrical surface of each spool is scored, by means of threads, grooves or the like, for engagement with the inner surface of the tubular member, and the lead-in conductor passes through axial holes provided in the spools. The end spools of the Fig. 2 modification are slightly longer than those of Fig. 1, the purpose of which is to increase voltage ratings by providing longer over-surface paths between the lead-in conductor and the tubular member. In accordance with this invention, the end spools are formed of a high alumina ceramic comprising eighty-five percent or more $Al_2O_3$.

Figure 4:
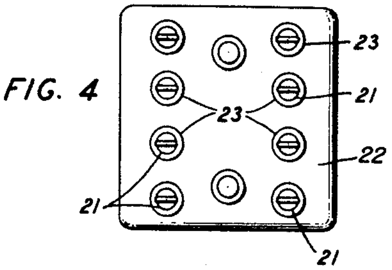
Fig. 4 is a top view of the container of Fig. 3 showing the position of a number of seal terminals on the end plate of the container.
Figure 3:
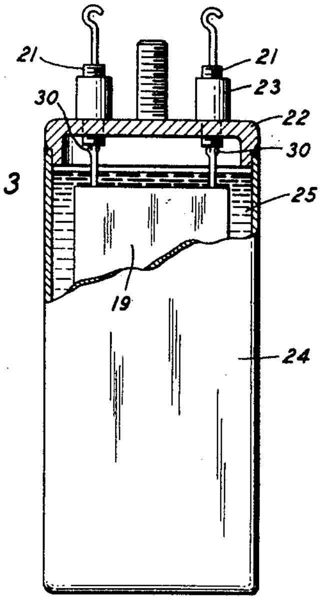
Fig. 3 is a side view, partly in section, of a container for an electrical component employing seal terminals in accordance with this invention.

Referring now to Figs. 3 and 4, there is shown one specific embodiment of these seal terminals in an oil filled container for a multi-unit condenser 19, wherein eight seal terminals 21 are positioned on an end plate 22 with eight tubular portions or members 23 integral therewith. A container 24, which may be welded to the end plate 22, is in this specific illustrative embodiment of extruded aluminum and the end plate is a cold pressed aluminum cover. Various die cast aluminum alloys could be employed, however, for the end plate 22 whereby a considerable economy could be realized; die cast aluminum alloys that could be used include Alcoa alloy 43, containing five percent silicon; Alcoa alloy 218, containing eight percent magnesium, or Alcoa alloy A380, containing three and one-half percent copper and nine percent silicon. Such a container having sealed terminals in accordance with this invention requires no breather hole as the seals can be made last without the application of heat, as described below, and thus the necessity for the breather hole is obviated. Further, the oil 25 may be introduced into the container through one of the tubular portions 23 as the presence of oil particles will not affect the seal.

In the fabrication of sealed terminals in accordance with this invention, the conductor is positioned in the outer metal wall or tubular portion, either by the insertion of a separate terminal conductor or by extending the apparatus lead from within the container through the tubular portion. The end spools and sealing bushing are then slipped over the conductor and fed into the tubular portion in the proper order. Alternatively, if a separate terminal conductor is employed, the end spools and sealing bushing may be positioned on the conductor and all placed into the tubular portion together. The relatively heavy but short outer wall or tubular portion is then subjected to a single compression stroke which is advantageously performed by a single stroke tool of such character that a substantially uniform pressure is created in the sealing bushing. This compression stroke is made on the terminal after all other operations concerning the fabrication of the particular container, unit, or electrical apparatus have been completed. Thus it is only after the various container or other parts are joined that the sealing bushings and end spools are positioned in the tubular portions and the seals made. Regardless of the metal used in the container the last terminal to be sealed by compression may be used for hermetic seal testing of the entire container by either the Helium Mass Spectrometer or by other methods known in the art, as well as being used for the evacuation of the container and/or the provision therein of a particular atmosphere. Therefore, as mentioned above, this last seal terminal eliminates the need for the breather hole priorly associated with hermetically sealed containers. If desired, this last compression seal need not include a terminal lead but may comprise only the end spools and sealing bushing within the tubular member.

The tubular member is compressed simultaneously onto the bushing and end spools by the single compression stroke, the end spools serving to provide for each side of the sealing bushing a bulkhead that becomes locked in place the instant the tubular member is deformed. The scoring of the outer surfaces of the end spools enhances the locking action thereof. In fact, the grooves or threads tend to dig into the inner surface of the metallic tubular member. Also, to some extent, the grooves or threads will be crushed but this crushing, in addition to the aforementioned digging in, increases the locking action. As stated above, the compression stroke serves further to radially compress the sealing bushing and this, coupled with the accompanying axial compression between the locked in end spools, results in a very high hydrostatic pressure being set up in the bushing.

Figure 5:
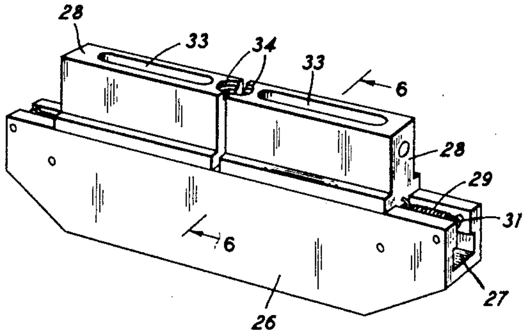
Fig. 5 is a perspective view of one compression tool that may be employed in the fabrication of seal terminals in accordance with this invention.
Figure 6:
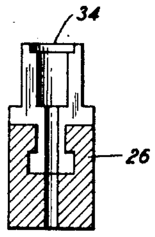
Fig. 6 is a cross-sectional view of the tool of Fig. 5 along the line 6—6 thereof.

One particular compression tool that may be advantageously employed in the fabrication of these sealed terminals is shown in Figs. 5 and 6. As there seen, the tool comprises a base guide member 26 having a groove 27 wherein two compression jaws 28 can slide, the groove assuring proper linear motion of the jaws. A spring 29 is attached to the outer end of each of the jaws 28 and to a pin 31 extending across the end of the groove 27 so that the jaws 28 are normally held slightly apart. The jaws themselves have each an elongated aperture 33 extending therein, the purpose of which is described further below, and mating semicircular apertures 34 at their inner ends adapted to receive the tubular member of the seal to be compressed. The springs 29 are so tensioned that the tubular member before compression may easily be fitted into the mating semicircular apertures 34 while the apertures themselves are dimensioned so that on closing the tubular member will be compressed the desired amount. The outer edges of the apertures 34 are of slightly larger radius than the apertures to allow space for slight extrusion of the tubular member after the compression stroke. The jaws 28 may themselves be jaws of a vise or may be positioned in a vise for the single compression stroke.

In fabricating the multiple terminal end plate of the container illustrated in Figs. 3 and 4, each terminal is compressed separately as it has not been found practicable to complete the seal of more than one terminal at a time in any given row of terminals. When a particular terminal in a row is positioned in the mating semicircular apertures 34 of the compression jaws 28, the other terminals of that row extend into the elongated apertures 33 in each jaw 28 and are thus unaffected by the compression stroke applied to the terminal between the jaws 28.

To maintain the ceramic end spools and the sealing bushing in proper position within the tubular member prior to compression, it may be necessary to provide small knobs, such as knobs 30 shown in Fig. 3. These knobs can advantageously be provided by squeezing the lead-in conductors at predetermined points along the lengths thereof. When the lead-in conductor has been positioned in the tubular member, a first end spool is slipped over the conductor and fed into the tubular member. This end spool will travel along the lead-in conductor until it engages the knob provided therein. Then in succession the sealing bushing and other end spool are likewise slipped over the conductor and fed into the tubular member. By a slight tapping of the uppermost end spool, all the elements will be properly positioned and ready for compression. Should it be desirable to insure against the turning of the conductor after assembly, the above-mentioned first end spool can be recessed to receive the knob 30.

In accordance with this invention, it is not required that the compressing jaws 28 have an appreciable travel as it is not necessary that the outer compression sleeve, which is the outer wall or tubular member 11 or 13, undergo appreciable deformation. In one specific embodiment of this invention in which the center conductor was a Phosphor bronze wire of about .045 inch diameter and the sealing bushing was of polytrifluorochloroethylene with an outside diameter turned to .250 inch and an inside diameter drilled to .045 inch, the outer diameter of the tubular member was reduced from .420 inch to .400 inch. The ceramic end spools were of one-quarter inch outside diameter with surface grooves .010 inch in depth.

It is not necessary that the respective elements be made with relatively close tolerances, it being sufficient if the tolerances are plus or minus two mils. The slight change in the dimensions of the tubular member due to the single compression stroke is sufficient to insure a completely hermetic, high pressure seal being formed both between the tubular member and the sealing bushing and between the lead-in conductor and the sealing bushing, as the KEL–F bushing has a very high resistance to deformation and hence a slight deformation creates extremely high hydrostatic pressures therein.

In order to best obtain an effective hermetic sealed terminal, it is desirable that the single compression stroke be such that the sealing bushing retain its circular cross section thereby indicating that there is uniform pressure in the outer tubular member with resulting uniform pressure between both the tubular member and the sealing bushing and the bushing and the lead-in conductor. It is therefore desirable that the tubular member be of sufficient wall thickness so that it will not crimp when subjected to the compression stroke but will cold flow evenly, the particular thickness at which crimping will occur being dependent upon the choice of material for the tubular member itself. At the other extreme, the tubular member should not be so thick as to inhibit the transfer of sufficient pressure to the sealing bushing. In the above discussed specific embodiment of this invention, the tubular member was of .085 inch wall thickness.

The overall dimensions of the seal may vary depending on the particular materials employed and the particular application for which the seal is to be used. In the specific illustrative embodiment described above wherein the outer diameter of the tubular member prior to the compression stroke was .420 inch, the seal length was approximately three-quarters of an inch. However, seals in accordance with this invention can be made to less than a quarter of this diameter with a corresponding shortening of the seal length. Thus it is apparent that these terminal seals are particularly adaptable for employment in the field of miniaturization wherein it is desired to utilize very minute electrical components positioned in sealed containers to obtain units of the smallest possible size.

Figure 7:
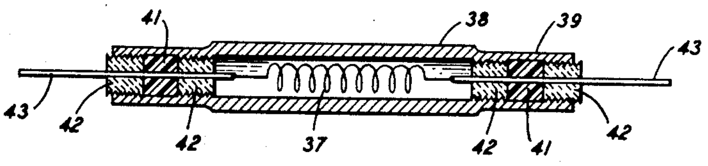
Fig. 7 is a sectional view of a tubular unit employing seal terminals in accordance with this invention.

One advantageous employment of these seal terminals is illustrated in Fig. 7, wherein is depicted one specific illustrative embodiment of this invention comprising a resistor 37, which may be carbon deposited or wire mounted in a tubular member 38 sealed at each end by hermetic seal terminals 39. Each terminal seal comprises a sealing bushing 41, a pair of ceramic end spools 42, and a terminal lead 43 extending through the sealing bushing and the ceramic end spools, the bushing being tightly pressed by the end portion of the tubular member 38. The compressed end portions of the tubular member 38 are shown greatly exaggerated in the drawing for purposes of illustration. The resistor 37 and the terminal leads 43 may be fed into the tubular member and the two seal terminals 39 made at the same time by a single compression stroke applied to each terminal, as described above. If it is desired to employ a thin walled member 38, metallic rings or bands may encompass the tubing at each seal 39 to provide the outer tubular member thereof.

Figure 9:
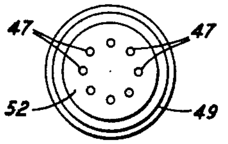
Fig. 9 is a top view of the embodiment of Fig. 8.
Figure 8:
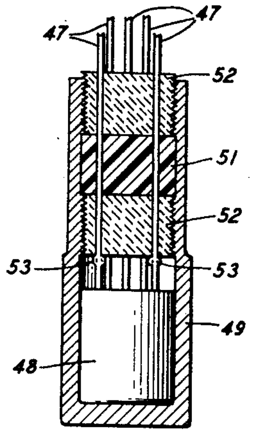
Fig. 8 is a sectional view of another specific illustrative embodiment of this device wherein an electrical component is mounted in a sealed container and has its terminals all extending through the same bushing and thus all within a single terminal seal.

In Figs. 8 and 9 is shown another illustrative embodiment of this invention wherein a number of terminal leads or conductors 47 extend through a single terminal seal fabricated by a single compression stroke. A component 48 requiring many leads, such as a storage device, is positioned within a small cup 49. A sealing bushing 51 and a pair of ceramic end spools 52 are positioned within the aluminum cup 49 with the apertures therein aligned and the leads running through the aligned apertures. The terminal seal is made in the manner described above, the compressed section of the cup being shown exaggerated for purposes of illustration. One or more terminal leads 47 may be provided with knobs 53 for the above described purpose. Containers such as cup 49 could also be employed for the mounting of transistors where three or four leads may be brought out through the terminal seal at one end of the container.

Figure 11:
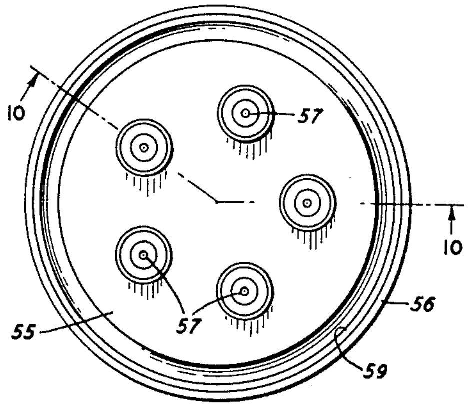
Fig. 11 is a top view of the amplifier header of Fig. 10.
Figure 10:
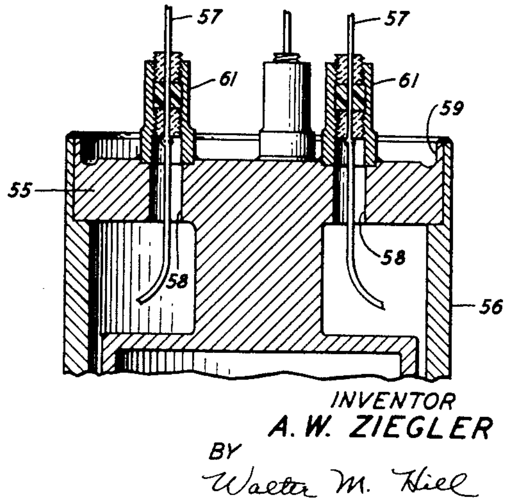
Fig. 10 is a sectional view of an underwater amplifier header employing seal terminals in accordance with this invention.

In Figs. 10 and 11 seal terminals in accordance with this invention are shown mounted upon a cover or header 55 of an underwater amplifier, such amplifiers being utilized in submarine cable work. The tubular members 61 are first brazed to the header 55, with the members in axial alignment with the apertures 58, and the leads 57 of the amplifier unit are then brought through the apertures 58 and the tubular members 61. Next the amplifier unit is positioned in the protective shell 56 and the header flange 59 is brazed to the shell. For the final operation a bushing and a pair of end spools are threaded onto each lead-in conductor and after being positioned in the manner set forth, a single compression stroke completes each seal.

The seal terminals herein disclosed possess many of the advantages, and are capable of as many of the uses, as the seal terminals disclosed in my copending application, Serial No. 303,633, filed August 9, 1952, now abandoned. However, because of the novel construction employed herein, high hydrostatic pressures are created within the sealing bushing with the result that this terminal is capable of withstanding extremely high differential pressures, as well as relatively high temperatures. Sealed terminals such as those disclosed herein have demonstrated their ability to withstand pressures up to 30,000 pounds per square inch and temperatures between −70° to 200° C. In fact, from all the information presently available, it seems reasonable that this terminal structure should be capable of operating at temperatures approaching those where the organic material becomes chemically unstable.

It is to be understood that the above-described embodiments are merely illustrative of the principles and applications of the present invention and that numerous modifications or alterations may be made therein without departing from the spirit and scope of the invention.

What is claimed is:

1. A high pressure compression seal terminal comprising a cylindrical sealing bushing, a pair of cylindrical substantially incompressible end spools each in abutment against an end of said bushing, a lead-in conductor extending through said bushing and said end spools, and an outer metallic tubular member encompassing said bushing and said end spools, said tubular member being circumferentially deformed along its length to radially compress said bushing and hold said end spools by compressive force so as to press said bushing radially as well as axially between said end spools, said end spools serving to provide for each side of said sealing bushing a rigid bulkhead that becomes locked in place upon compression of said tubular member.

2. A high pressure compression seal terminal as defined in claim 1 wherein the outer cylindrical surfaces of said end spools are scored.

References Cited in the file of this patent

UNITED STATES PATENTS

| | | |
|---|---|---|
| 1,731,597 | Spear | Oct. 15, 1929 |
| 2,128,412 | Harley | Aug. 30, 1938 |
| 2,431,951 | Mauerer | Dec. 2, 1947 |
| 2,579,973 | Schlosser | Dec. 25, 1951 |
| 2,606,849 | Dantsizen | Aug. 12, 1952 |
| 2,652,622 | Charbonneau | Sept. 22, 1953 |
| 2,794,062 | McCall | May 28, 1957 |
| 2,888,656 | Bremer | May 26, 1959 |

FOREIGN PATENTS

| | | |
|---|---|---|
| 770,233 | France | June 25, 1934 |
| 659,223 | Great Britain | Oct. 17, 1951 |